July 16, 1940.　　　　B. M. CARTER　　　　2,208,247
PRODUCTION OF SULPHUR
Filed June 10, 1935
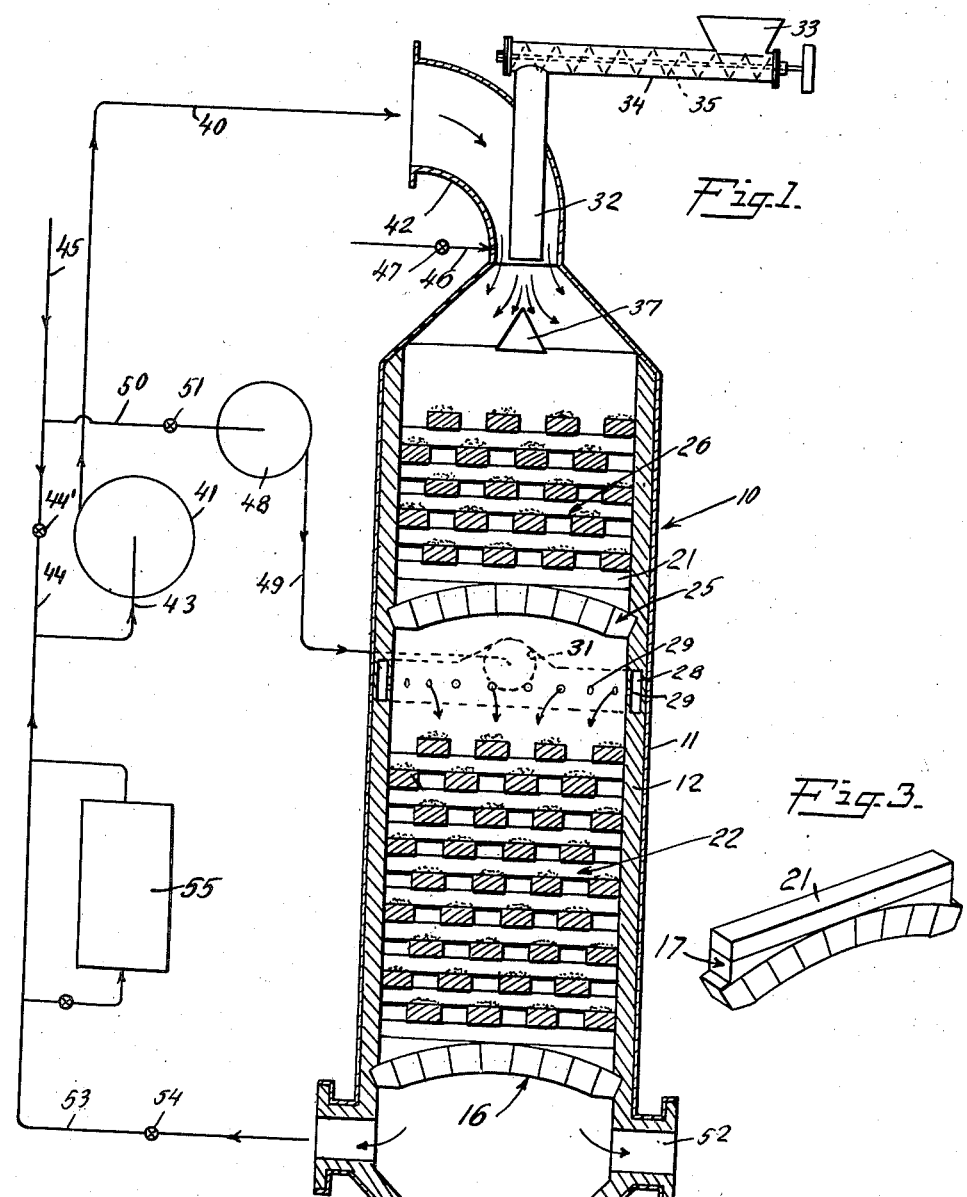
Fig.1.
Fig.3.
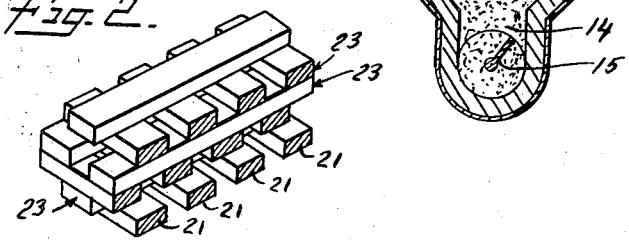
Fig.2.
INVENTOR
B. M. Carter.
BY
ATTORNEY Patented July 16, 1940

2,208,247

UNITED STATES PATENT OFFICE 2,208,247

PRODUCTION OF SULPHUR

Bernard M. Carter, Montclair, N. J., assignor to General Chemical Company, New York, N. Y., a corporation of New York Application June 10, 1935, Serial No. 25,767

6 Claims. (Cl. 23—226)

This invention relates generally to the reduction of sulphur dioxide to sulphur and/or hydrogen sulphide. The invention contemplates chiefly the reduction of sulphur dioxide to elemental sulphur, and accordingly, for convenience, the invention is hereinafter described in connection with the production of elemental sulphur, although it is to be understood that the principles of the present improvements apply to the formation of hydrogen sulphide if such end product is desired.

Broadly, the invention relates to a process for the production of elemental sulphur from sulphur dioxide or gas mixtures containing the same, irrespective of the source of the sulphur dioxide. More particularly, the invention is directed to the production of sulphur from sulphur dioxide gas mixtures evolved in the decomposition of sulphuric acid sludges constituting waste products of numerous oil refining processes, and especially comprehends the reduction of sulphur dioxide by means of a reagent-catalyst comprising the solid carbonaceous residue also formed in the decomposition of acid sludges. The invention is further directed to methods for the recovery of sulphur as such from acid sludges, and to improved processes for reducing sulphur dioxide contained in a relatively concentrated sulphur dioxide gas mixture.

Processes for the production of sulphur from sulphur dioxide gas mixtures by contacting the sulphur dioxide, at elevated temperatures, with carbonaceous reducing agents have heretofore been proposed. Such processes, however, comprise a reduction reaction effected at high temperatures, as distinguished from the method of the present invention, according to which reduction may be readily accomplished at relatively low temperatures. Several processes have also been suggested for the recovery, from acid sludges, of sulphur as sulphur dioxide. Such latter operations involve, generally speaking, decomposition or destructive distillation of acid sludges by heating, with evolution of gas mixtures containing sulphur dioxide, and accompanying formation of solid carbonaceous residues of varying composition.

It has been found that carbonaceous residues obtained by the decomposition of acid sludges are superior reagent-catalysts for effecting the reduction of sulphur dioxide to elemental sulphur, and that by so employing such residues, the reduction reaction may be efficiently carried out at temperatures materially less than heretofore. When the destructive distillation of acid sludges is permitted to proceed approximately to that point at which the acid constituent of the sludges are substantially broken up, the carbonaceous residues so obtained include appreciable quantities of volatile hydrocarbons. It has also been ascertained that these residues, containing volatile matter, constitute remarkably efficient reagent-catalysts for the production of elemental sulphur from sulphur dioxide for the reason that such residues not only act to promote the reduction reaction, but additionally serve as economical sources of reducing reagents. Although the invention contemplates utilization of the above reagent-catalysts for the reduction of sulphur dioxide irrespective of the source of the sulphur dioxide, in the preferred embodiment of the invention, such carbonaceous residues are used for the production of elemental sulphur from sulphurous gas mixtures formed by the destructive distillation of acid sludges.

One of the principal objects of the invention lies in the provision of a process for producing elemental sulphur from sulphur dioxide or gas mixtures of the same involving contacting the sulphur dioxide gas with carbonaceous residues resulting from the decomposition of acid sludges. As noted, these residues are particularly effective for reduction of sulphur dioxide, both the fixed carbon and the volatile matter contained in the residues being available as reducing agents. Thus, as a further important object, the invention aims to provide a method for reducing sulphur dioxide according to which the reducing operation may be carried out in such manner that the volatile matter and the fixed carbon may both be utilized in the reducing reaction, or so that substantially only the volatile matter of the residues may be consumed in reducing the sulphur dioxide.

The reduction of sulphur dioxide to elemental sulphur by means of reducing agents takes place in an exothermic reaction in which relatively large quantities of heat are generated. During the reaction the temperature rises excessively, and hydrogen sulphide tends to form, thus reducing the amount of elemental sulphur recovered as such. Accordingly, when elemental sulphur is the desired end product, the reaction is preferably carried out at lower temperatures. Hence, another object of the invention contemplates the provision of a method for the reduction of sulphur dioxide to sulphur in a reaction involving the use of hydrocarbon reducing agents carried out at relatively low temperatures and in such manner that adequate temperature control may be readily had and substantially complete reduction of sulphur dioxide to sulphur may be obtained. The invention also includes a method for the recovery from acid sludge of sulphur in elemental form, and provides apparatus for carrying out the process improvements.

Generally considered, the invention comprises the introduction of a sulphur dioxide gas stream and granulated acid sludge carbonaceous residues into a reaction zone, reacting the sulphur dioxide with reducing agents contained in the residues to reduce sulphur dioxide to sulphur, and controlling the reaction so that the volatile matter and fixed carbon of the residues are completely utilized in the reducing operation, or alternatively, controlling the reaction so that substantially only the volatile matter of the residues is consumed. Since acid sludge residues usually contain considerable quantities of volatile matter, in accordance with the preferred embodiment of the invention, the reduction reaction is conducted in such manner that carbonaceous residues are moved co-current with the sulphur dioxide gas stream through the reaction zone at a rate considerably less than that of the sulphur dioxide gas stream but at a rate such that substantially only the volatile matter of the residue is utilized in reducing the sulphur dioxide. When so operating, the volatile matter of the carbonaceous residues is economically consumed in reducing sulphur dioxide, and a grade of coke is discharged from the reaction zone substantially free of volatile constituents which is suitable for use as fuel and for other purposes.

A further appreciation of the objects and advantages of the invention may be had from a consideration of the following description taken in connection with the accompanying drawing in which—

Fig. 1 is an elevation, partly in section and partly diagrammatic, of one form of apparatus in which the process of the invention may be carried out;

Fig. 2 is a perspective showing the arrangement of baffles in the reaction chamber; and Fig. 3 is a perspective of a baffle supporting arch.

Referring to the drawing, 10 indicates a reduction chamber comprising preferably a cylindrical steel shell 11 provided with a firebrick lining 12 of substantial thickness. The lower end of the reduction chamber is funnel-shaped, and terminates in a pit 14 having a screw conveyor 15 arranged to permit withdrawal of the solid material from the reduction chamber without admitting air thereto. The conveyor may be constructed of material such as cast iron or chrome steel to withstand the corrosive action of the reduction products at high temperatures.

At the lower end of the reaction chamber is a baffle support, indicated at 16. The support comprises a plurality of horizontally spaced apart, parallel firebrick arches 17, one of which is shown in perspective in Fig. 3. Resting on support 16 is a plurality of baffles 21 constituting a checkerwork section indicated generally by reference numeral 22. One feature of the reduction chamber construction comprises the arrangement of the checkerwork in the reaction chamber which effects intimate contact of the gas and carbonaceous material passing through the reaction chamber, and which reduces to a minimum, resistance to flow of gas through the reduction chamber. The checkerwork of section 22 comprises a plurality of superposed layers or series 23, each series including a plurality of horizontally disposed elongated baffles 21. The baffles 21 of each series 23 are preferably made of bauxite brick, and arranged parallel to each other and spaced apart a distance less than the width of an individual baffle 21. The baffles of each series contact with and are disposed preferably at right angles with respect to baffles of the immediately adjacent upper and lower series. It will be seen from an inspection of Fig. 2, that the baffles of alternate series are parallel, but alternate series are offset horizontally so that there are no vertical channels of appreciable length in the checkerwork. Accordingly, the gas passages of the checkerwork are circuitous, and the carbonaceous residues on the baffles present large surfaces to the gas stream flowing through the reduction chamber.

Spaced somewhat above the horizontal midsection of the reduction chamber is another baffle support 25 carrying a second section 26 of baffles 21, the arrangement of the baffles of the upper section being the same as described in connection with Fig. 2. In the firebrick lining 12, is an annular gas inlet chamber 28 communicating with the reaction chamber through a plurality of small radial openings 29. A gas inlet 31 opens into chamber 28 at any convenient point.

Granulated carbonaceous residues may be introduced into the upper end of the reduction chamber through an inlet conduit 32 projecting into the reaction chamber. Residues are continuously fed from supply hopper 33 into the upper end of inlet 32 through conduit 34 by a screw conveyor 35. Immediately beneath the lower end of the inlet pipe 32 is a cone 37 adapted to facilitate distribution of carbonaceous residue evenly over the upper surface of the checkerwork section 26.

Sulphur dixide gases are forced into the reduction chamber through the conduit 40 connected at one end to the pressure side of blower 41 and at the other end with inlet sleeve 42. As indicated on the drawing, the cross-section of sleeve 42 decreases rapidly to a minimum at the point of connection with the upper end of the shell 11 of the reduction chamber. Since the top of the reduction chamber is cone-shaped, it will be seen that there is provided at the point of introduction of gas into the reduction chamber, a Venturi tube effect which, in conjunction with the distributing cone 37, acts to effectively distribute carbonaceous material over the entire upper surface of checkerwork 26.

The inlet side of the blower 41 communicates through pipes 43 and 44, the latter having a control valve 44', and pipe 45 with a source of sulphur dioxide gas. Reducing gases may, when desired, be introduced into the top of the reduction chamber through a connection 46, provided with control valve 47. The inlet 31 of gas chamber 28 is connected to the pressure side of an auxiliary blower 48 through pipe 49, and the inlet of the blower communicates with gas inlet pipe 45 through a gas line 50 controlled by valve 51.

Gaseous products of reaction are discharged from the reduction chamber through an outlet pipe 52 leading to appropriate condensing apparatus. Any quantity of product gases of the reaction may be withdrawn from the lower end of the reduction chamber by blower 41 thru a conduit 53, having a valve 54, and opening at one end into the converter and at the other end into the pipe 43 on the inlet side of the blower. A cooler in gas line 53 is indicated at 55.

The following illustrative example is given in connection with the recovery of sulphur from acid sludges.

Sulphuric acid sludges, resulting from the refining of oils, vary widely in composition. One representative sludge was found to have a titratable acidity of about 50.8% expressed as $H_2SO_4$, and yielded on decomposition by destructive distillation about 28% residual coke, and a retort gas which, after cooling to about normal temperatures, produced about 6% condensable oils, about 35% water, the balance of the retort gas comprising sulphur dioxide, carbon dioxide, carbon monoxide, nitrogen, and noncondensed hydrocarbons and water vapor. Although the invention is, of course, not dependent upon any particular method for the production of a sulphur dioxide gas mixture or process for the destructive distillation of acid sludge to produce a sulphur dioxide gas mixture, decomposition of the sludge may be advantageously effected by externally heating a charge of sludge, in a substantially air-tight retort at relatively low temperatures, for example from 300 to 600° F. On heating, the free and combined sulphuric acid contained in the sludge is decomposed by hydrogen of hydrocarbons and/or by the carbonaceous matter present in the sludge, and the gas mixture evolved contains sulphur dioxide and water as the major constituents, together with smaller quantities of hydrocarbon vapors, carbon dioxide, carbon monoxide and nitrogen.

Preferably, decomposition of the sludge is effected at such relatively low temperatures as above noted, and under such conditions that destructive distillation proceeds only to approximately a point at which substantially all the free and combined sulphuric acid initially contained in the sludge is decomposed. In this situation, the solid carbonaceous residues produced usually contain appreciable quantities of volatile matter, principally hydrocarbons, which in some cases may run in excess of 38–40%. Accordingly, destructive distillation of the sludge is not preferably carried beyond the condition at which substantially all of the free and combined sulphuric acid is broken up. One example of carbonaceous residue produced as contemplated may analyze substantially as follows:

|  | Per cent |
|---|---|
| Total acidity | 2.1 $H_2SO_4$ |
| Ash | 1.2 |
| Total volatile matter, including $H_2SO_4$ | 32.1 |
| Fixed carbon | 66.7 |

The exit gases from the decomposing retort are cooled to, say 100° F. or lower if desired, and the bulk of the water and hydrocarbon vapors are condensed and separated from the gas stream. Since decomposition of sludge is preferably effected substantially in the absence of air or other diluting gas, the retort gas mixture after separation of water and condensable hydrocarbons, is rich in sulphur dioxide, and if completely dry, may contain 70–95% sulphur dioxide by volume, the balance consisting chiefly of uncondensed water and hydrocarbon vapors and smaller amounts of carbon dioxide, carbon monoxide and nitrogen. In the present example, the gas mixture after cooling may contain, for example, by volume, 85% sulphur dioxide, 5.5% water vapor, 5% gaseous hydrocarbons, 1.2% carbon dioxide, 1.0% carbon monoxide, and 2.3% nitrogen originating in the nitrogen containing compounds present in the sludge. The amount of water vapor remaining in the gas will, of course, depend largely on the extent to which the gas is cooled to condense out the water. It is preferred, however, not to completely dry the gas, since the presence of about 4–8% by volume of water vapor in the gas stream appears advantageous in preventing formation of COS in the subsequent reduction reaction.

The carbonaceous residue produced in the manner above described is substantially dry to the touch and may be readily granulated and broken up into finely divided condition. A supply of such residue is maintained in the hopper 33 by any appropriate mechanism. Before the sulphur dioxide gas stream is admitted into the reduction chamber, which has been strongly preheated by suitable oil or gas burners to bring the temperature of the reduction chamber up to about 850–950° F., the residue feed mechanism is operated to charge into the reduction chamber sufficient carbonaceous residue to form on the tops of each of the baffles 21 small mounds of loosely associated material, any excess falling through baffle support 16, and into the pit 14. Because of the particular arrangement of the baffles comprising the checker-work sections 22 and 26, there are provided numerous relatively wide unobstructed gas passages through the reduction chamber. At the same time the baffling effect of the checkerwork is such as to cause repeated contacts of gases with the large surfaces of carbonaceous residue on the baffles.

In accordance with the invention, the sulphur dioxide of the gas mixture, produced preferably as noted above in connection with the decomposition of acid sludge, is reduced to elemental sulphur by contacting the sulphur dioxide gas with the solid carbonaceous residue resulting from the decomposition of acid sludge. When the operation of the process is initiated, the gases drawn into the apparatus through pipe 45 by main blower 41 are preheated by any appropriate means preferably to about 850° F., and introduced at this temperature into the reaction chamber.

Because of the catalytic properties of the carbonaceous residues, the reaction starts immediately at the relatively low temperature noted, and reduction of sulphur dioxide to sulphur by hydrocarbons proceeds. In the preferred form of the invention, the carbonaceous residues utilized are those containing substantial amounts of volatile hydrocarbons. When operating with this type of residue, volatile hydrocarbons in the residue are primarily utilized in the reduction of the sulphur dioxide, and it appears that the reduction takes place selectively to a substantial extent, i. e., the $SO_2$ appears to be reduced first by the volatile hydrocarbons and as the volatile hydrocarbons become exhausted the temperature necessary to bring about reduction of the $SO_2$ by the non-volatile portion of the residue increases. Hence, in accordance with a preferred modification of my invention, the reduction of the sulphur dioxide is effected substantially entirely by the volatile hydrocarbon content of the residue, and when the volatile matter in the residue becomes substantially exhausted, the residual coke is withdrawn from the reaction chamber. This mode of operation permits the economical use of the volatile matter in the residue, and at the same time provides for the withdrawal of the residue from a reaction chamber at about the time available volatile matter of the residue is exhausted. The residue when discharged from the reaction chamber at this stage is a porous remarkably active coke and may be used where cokes of this nature are desirable or may be used as fuel or otherwise.

When operating pursuant to the preferred mode, carbonaceous residue is fed through the reaction chamber at a rate such that the material discharged from the converter by the screw conveyor 15 contains substantially no volatile matter. The rate of flow of carbonaceous material through the apparatus may be controlled by suitable operation of the conveyor 35. When so proceeding, the carbonaceous material moves through the reaction chamber at a rate considerably less than that of the sulphur dioxide gas stream but still at such rate that substantially only the volatile matter of the carbonaceous residue is consumed in reducing the sulphur dioxide. Utilizing a carbonaceous residue of the above noted composition, the coke withdrawn from the reduction chamber amounts to about two-thirds of that fed in at the top.

If it is desired to conduct the process so that in addition to the volatile matter, the fixed carbon of the carbonaceous residues is also utilized in reducing the sulphur dioxide, carbonaceous material is fed into the converter in quantities sufficient to maintain the reducing reaction, but the supply is limited to such an extent that the material discharged from the reduction chamber by the conveyor 15 is substantially all ash.

When operating with a residue which, because of the method of decomposition, contains but little or even no volatile matter available as a reducing agent, the residue is nevertheless an efficient reagent-catalyst for reduction of sulphur dioxide, although a somewhat higher reaction temperature is necessary than when the residue contains a substantial quantity of volatile matter. For example, when the residue is low in volatile matter, the reaction may be initiated advantageously at a higher temperature, say about 950-1000° F. In general, as the volatile matter content of the residue drops, the temperature should increase to continue the reduction reaction.

The invention further contemplates use of the residue from sludge decomposition as a reagent-catalyst for the reduction of sulphur dioxide in conjunction with a reducing gas such as natural gas, since the residue from sludge decomposition facilitates reduction of sulphur dioxide by reducing gases, and causes the reaction to take place at temperatures lower than would be possible with the reducing gas alone. In instances where it is desired to utilize a reducing gas, such may be introduced into the system, in the desired quantities, either through valve-controlled connection 45 or at the inlet of the reduction chamber.

The reduction reaction taking place in the reduction chamber is exothermic, and particularly where the concentration of sulphur dioxide is high, relatively large quantities of heat are generated. If the temperature is permitted to rise above, say 1200° F., large quantities of hydrogen sulphide tend to form. Hence, when it is desired to produce elemental sulphur, the temperature in the reaction chamber should preferably be so controlled as to avoid temperatures at the outlet end of the reduction chamber substantially in excess of about 1200° F. When it is desired to produce hydrogen sulphide, the temperature in the combustion chamber should preferably be maintained at around 1300-1400° F. When the temperature of the reaction is maintained approximately within the limits noted, there is no apparent tendency of the coke particles to fuse.

In accordance with the invention, the reduction operation may be carried out in two ways; first, by introducing all of the raw gas into the top of the reduction chamber, or second, by introducing part of the raw gas into the top and the remaining portion of the raw gas into the mid-section of the reduction chamber, the latter being the preferred procedure.

In the first method, temperature control of the reaction is effected by withdrawing regulated quantities of reaction products from the lower end of the reduction chamber, and mixing the same with the incoming gas stream, thus diluting the latter with inert gases. In the present illustrative example, it will be recalled, the concentrated sulphur dioxide entering the inlet pipe 45 is at temperatures of about 100° F. Hence, it is desirable to preheat the incoming gas mixture so that the temperature of the same entering the upper end of the reduction chamber is about 850° F. Admixture of hot reduction products with the incoming gas stream serves two purposes; first, it heats up the incoming gas stream to reactive temperature, and second, it dilutes the incoming gas to such extent as to avoid excessive temperatures in the reduction chamber. Thus, valve 54 in the pipe 53 is opened to permit withdrawal by blower 41 from the reduction chamber of sufficient quantities of reacted gases to preheat the gas mixture passing through the pipe 40 into the reduction chamber to the desired degree, and further dilute the gas mixture so as to avoid excessive temperatures in the reduction chamber.

It will be understood the quantity of reacted gases withdrawn from the reduction chamber through pipe connection 53, admixed with the incoming gas stream and recycled through the reduction chamber is dependent upon the particular operating conditions arising. Preferably, only such quantities of reaction products are recycled as may be needed first, to raise the temperature of the raw incoming gas stream introduced into the upper end of the reduction chamber to approximately 850° F., and second, to dilute the gas sufficiently to avoid excessive temperatures in the reduction chamber. For example, where the temperature of the reaction products in pipe 53 is around 1100-1200° F., and the temperature of the gas stream entering the apparatus through pipe 45 is about 100° F., and where the entire incoming stream of raw gas is to be introduced into the top of the reduction chamber, ordinarily the admixture of about two to four volumes (standard conditions) of reaction products with one volume of raw incoming gas is generally sufficient to dilute the raw gas to the desired extent and to raise the temperature of the resulting gas mixture to about 850° F., i. e. the temperature at which the combined gases are admitted to the reduction chamber. Under some operating conditions, for example where the sulphur dioxide concentration of the gas in line 45 is high as mentioned above, the amount of recycled reaction products required to dilute the gas stream sufficient to avoid excessive temperature rise in the reaction chamber, may be sufficiently in excess of that required to heat the incoming gas stream so as to raise the temperature of the gas stream as it enters the reduction chamber considerably above the desired initial temperature, thus decreasing the permissive temperature rise during the reduction reaction. To avoid this condition, a controlled amount of the products in line 53 may be by-passed through cooler 55 which may be arranged to recover in liquid form any sulphur condensed, so that the gas stream on entering the reduction chamber is heated only to about the desired temperature, i. e. 850° F. Accordingly, when operating in accordance with the first method, that is, where all of the raw gas is introduced into the top of the reduction chamber, it is preferred to cool the recycled products in a suitable cooler 55 to such extent that when the desired quantity of reaction products is admixed with the incoming raw gas to preheat the same and additionally dilute the gas stream for temperature control in the reduction chamber, the temperature of the gas stream on entering the top of the reduction chamber is approximately 850° F.

In accordance with the second and preferred method of carrying out the reduction reaction, only a portion of the raw gas stream is admitted to the reduction chamber through inlet 42, the remaining portion being introduced through the annular gas inlet 28. By adjustment of valve 44', the portion of raw gas to be fed into the top of the reduction chamber is drawn through inlet 45 and pipe 44 by blower 41, and mixed in line 43 with reaction products from gas line 53 in quantities preferably only sufficient to raise the temperature of the resulting gas mixture to about 850° F. The amount of reaction products from line 53 needed to pre-heat the portion of raw gas fed into the top of the reduction chamber may vary, depending upon particular conditions, from 2 to 4 volumes for each volume of raw gas entering through pipe 44. Since in this mode of operation, the amount of hot reaction products admixed with the portion of raw gas in line 40 is preferably not more than enough to raise the temperature of the gas mixture in line 40 to initial reaction temperature, no additional quantity of reaction products being added for temperature control in the upper end of the reduction chamber, the hot reaction products are not cooled and the cooler 55 may be omitted.

The reaction taking place in the upper end of the reduction chamber, or in the section which may be considered the initial reduction stage, raises the temperature of the reacting substances to say 1100° F., and preferably not higher than about 1200° F., at which temperature the gas stream passes through baffle support 25 into the lower section of the reduction chamber, or what may be deemed the final stage of the reduction reaction. The remaining portion of the cool raw gas from inlet 45 is charged into the reduction chamber by blower 48 through pipe 49 and the chamber 28. Fresh cool gas introduced in this manner into the reduction chamber is preheated to reactive temperature, and the temperature of the resulting gas mixture on entering the final stage of reduction is reduced to about 900° F. When operating with an acid sludge approximately of the composition previously noted, each pound of sludge decomposed produces approximately one-third of a pound of gas after cooling of the gas mixture to about 100° F. to separate the bulk of the water vapor and condensable hydrocarbons. With a gas of this nature, mentioned for illustrative purposes, about a third of the raw gas entering through inlet 45 may be introduced into the reaction chamber at the top, the balance being fed into the intermediate section of the reduction chamber. When so proceeding, a maximum quantity of cool raw gas may be fed into the reduction chamber through inlet 28, at the same time not reducing the temperature of the resulting gas mixture below about 900° F. as the gas mixture enters the final stage of the reduction reaction. Whatever the nature or source of the sulphur dioxide gas mixture employed, the respective amounts of gas fed into the top and into the mid-section of the reduction chamber should be proportioned so that the temperature of the gas mixture entering the second stage of the reduction reaction is preferably not reduced below about 900° F. This mode of operation simultaneously facilitates temperature control in the reduction chamber, preheats a substantial portion of the fresh incoming gas and lowers the temperature in the reaction chamber, increases the output of the apparatus, and materially reduces the amount of reaction products required to be recycled and the size and capacity of the recycling apparatus. These advantages described as applying to a two-zone reduction chamber may be further increased by use of more than two zones. While for purposes of illustration, a two-zone operation has been described, a four or five zone arrangement would be preferable on account of the reduced amount of gas needed to be recycled to initiate the reaction. It will be understood that a plurality of reduction zones may be placed in one vessel or in a plurality of separate vessels, each succeeding vessel being larger to accommodate increased gas volumes.

The exit gases of the reaction chamber contain sulphur generally as vapor, a relatively large amount of water vapor, appreciable amounts of carbon dioxide, and smaller quantities of sulphur dioxide, hydrogen sulphide, carbon monoxide and some hydrocarbons. For example, when operating with a gas approximately of the composition mentioned above, the exit gases may contain by volume about 23% sulphur, 2.3% $SO_2$, 6.0% $H_2S$, 48.8% $CO_2$, 1.5% CO, 11.8% $H_2O$, 4.3% hydrocarbons, and 2.3% $N_2$.

The sulphur may be recovered from the exit gases of the reaction chamber in any desirable manner. If, after separation of the sulphur, the residual gases contain appreciable quantities of hydrogen sulphide and sulphur dioxide, the sulphur content of the exit gases may be recovered by passing the gases at suitable temperature over a suitable catalyst, such as bauxite, to effect reaction of sulphur dioxide and hydrogen sulphide to produce sulphur. It will be understood, of course, that before passing the gas mixture into the catalyst chamber, the sulphur dioxide-hydrogen sulphide content of the gas should be adjusted to provide reacting proportions of sulphur dioxide and hydrogen sulphide.

I claim:

1. The method of reducing sulphur dioxide in a multi-stage exothermic reducing reaction which comprises pre-heating to initial reactive temperature by means of heat generated in a subsequent stage of reduction, a minor portion of a cool gas stream containing sulphur dioxide in concentration sufficient to maintain the reduction reaction exothermic, introducing into an initial reaction zone such preheated sulphur dioxide gas and solid carbonaceous material containing substantial amounts of volatile matter and formed by decomposing by heating acid sludge derived from sulphuric acid treatment of petroleum, reacting sulphur dioxide and solid carbonaceous material in said initial reaction zone to reduce sulphur dioxide under conditions generating heat and tending to raise the temperature above about 1400° F., introducing into the reacting gas stream the balance of said cool gas of sulphur dioxide concentration sufficient to maintain reduction thereof exothermic and in quantity proportioned so as to reduce the temperature of the reacting gas stream to substantially less than 1400° F. but not below said initial reaction temperature, introducing into a second reaction zone the resulting sulphur dioxide gas stream and further quantities of said solid carbonaceous material, reacting the sulphur dioxide and the carbonaceous material at temperatures less than about 1400° F., and withdrawing sulphur dioxide reduction product from said second reaction zone.

2. The method of reducing sulphur dioxide in a multi-stage exothermic reducing reaction which comprises pre-heating to initial reactive temperature, by means of heat generated in a subsequent stage of reduction, a gas stream containing sulphur dioxide in concentration sufficient to maintain the reduction reaction exothermic, introducing into an initial reaction zone the preheated sulphur dioxide gas and reducing material comprising solid carbonaceous material containing substantial amounts of volatile matter and formed by decomposing by heating acid sludge derived from sulphuric acid treatment of petroleum, reacting sulphur dioxide and reducing material in the reaction zone to reduce sulphur dioxide under conditions generating heat and tending to raise the temperature above about 1400° F., introducing into the reacting gas stream, containing substantial quantities of unreacted reducing material, gas of sulphur dioxide concentration sufficient to maintain reduction thereof exothermic and in quantity proportioned to reduce the temperature of the reacting gas stream to substantially less than 1400° F. but not below said initial reactive temperature, introducing into a second reaction zone and resulting sulphur dioxide gas stream and said unreacted quantities of reducing material, reacting the sulphur dioxide and reducing material at temperatures less than about 1400° F. and recovering sulphur dioxide reduction product.

3. A process for the reduction of sulphur dioxide to elemental sulphur by means of carbon which comprises introducing sulphur dioxide, at a temperature sufficiently high to establish the reducing reactions, into a zone of reducing solid fuel consisting essentially of carbonaceous material and controlling the temperature of the reducing reactions by admitting at subsequent levels in the zone of fuel additional sulphur dioxide at a temperature below the prevailing temperature of the reacting gases at the point of admission.

4. A process for the reduction of sulphur dioxide to elemental sulphur by means of carbon which comprises introducing sulphur dioxide, at a temperature sufficiently high to establish the reducing reactions, into one end of a zone of reducing solid fuel consisting essentially of carbonaceous material and controlling the temperature of the reducing reactions by admitting at subsequent levels in the zone of fuel additional sulphur dioxide at a temperature below the prevailing temperature of the reacting gases at the point of admission.

5. A process for the reduction of sulphur dioxide to elemental sulphur by means of carbon which comprises introducing sulphur dioxide, preheated to a temperature sufficiently high to establish the reducing reactions, into a zone of reducing solid fuel consisting essentially of carbonaceous material, controlling the temperature of the reducing reactions by admitting, at subsequent levels in the zone of fuel, additional sulphur dioxide at a temperature below the prevailing temperature of the reacting gases at the point of admission and utilizing the sensible heat of the hot gaseous products of the reducing reactions to preheat fresh sulphur dioxide prior to its admission to the fuel body.

6. A process for the reduction of sulphur dioxide to elemental sulphur by means of carbon which comprises introducing sulphur dioxide, at temperature sufficiently high to establish the reducing reactions, into a zone of reducing solid fuel consisting essentially of carbonaceous material, and controlling the temperature of the reducing reactions by admitting into the zone of fuel, at a point subsequent to the point of initial admission of said sulphur dioxide, additional sulphur dioxide at a temperature below the prevailing temperature of the reacting gases at said first mentioned point of admission.

BERNARD M. CARTER.